United States Patent [19]
Christopher

[11] 3,785,349
[45] Jan. 15, 1974

[54] LIVE POULTRY CATCHER
[76] Inventor: James E. Christopher, 3715 69th St., Lubbock, Tex. 79413
[22] Filed: July 3, 1972
[21] Appl. No.: 268,571

Related U.S. Application Data
[63] Continuation of Ser. No. 48,921, June 18, 1970, abandoned, which is a continuation of Ser. No. 78,345, Dec. 5, 1968, abandoned.

[52] U.S. Cl.................... 119/82, 119/151, 214/77
[51] Int. Cl............................................ A01k 29/00
[58] Field of Search ................ 119/82, 97, 21, 151; 56/16.1; 171/63; 214/77, 91, 660, 671–674

[56] References Cited
UNITED STATES PATENTS
| | | | |
|---|---|---|---|
| 1,194,179 | 8/1916 | Hill | 214/91 |
| 3,356,158 | 12/1967 | Deaver et al. | 171/63 |
| 3,420,211 | 1/1969 | Hartrickson | 119/82 |
| 3,476,089 | 11/1969 | Jerome | 119/82 |

Primary Examiner—Hugh R. Chamblee
Attorney—Glenn K. Robbins

[57] ABSTRACT

A live poultry catcher for collection of poultry in a poultry house. The poultry catcher is mounted upon wheels and is provided with extensible pickup bars, which extend horizontally under the chicken or other type of poultry. The pickup bars are adapted to be rotated upwardly with protective tip guards to lift the chickens and move them along a protective shield to deposit the chickens under a hood upon conveyor belts which feed the chickens onto a central conveyor belt. The central conveyor belt feeds the chickens in an extensible conveyor hood to deposit them into a collection crate. By means of the extensible accordion-type conveyor hood, the poultry catcher, which extends from one side wall to an opposite wall or divider fence in a chicken house, can be propelled to collect the chickens by means of the pickup bars where they are then conveyed to a collection coop or crate. The poultry catcher is operated by one attendant and can provide for complete collection of poultry with a minimum of labor.

17 Claims, 10 Drawing Figures

PATENTED JAN 15 1974
3,785,349
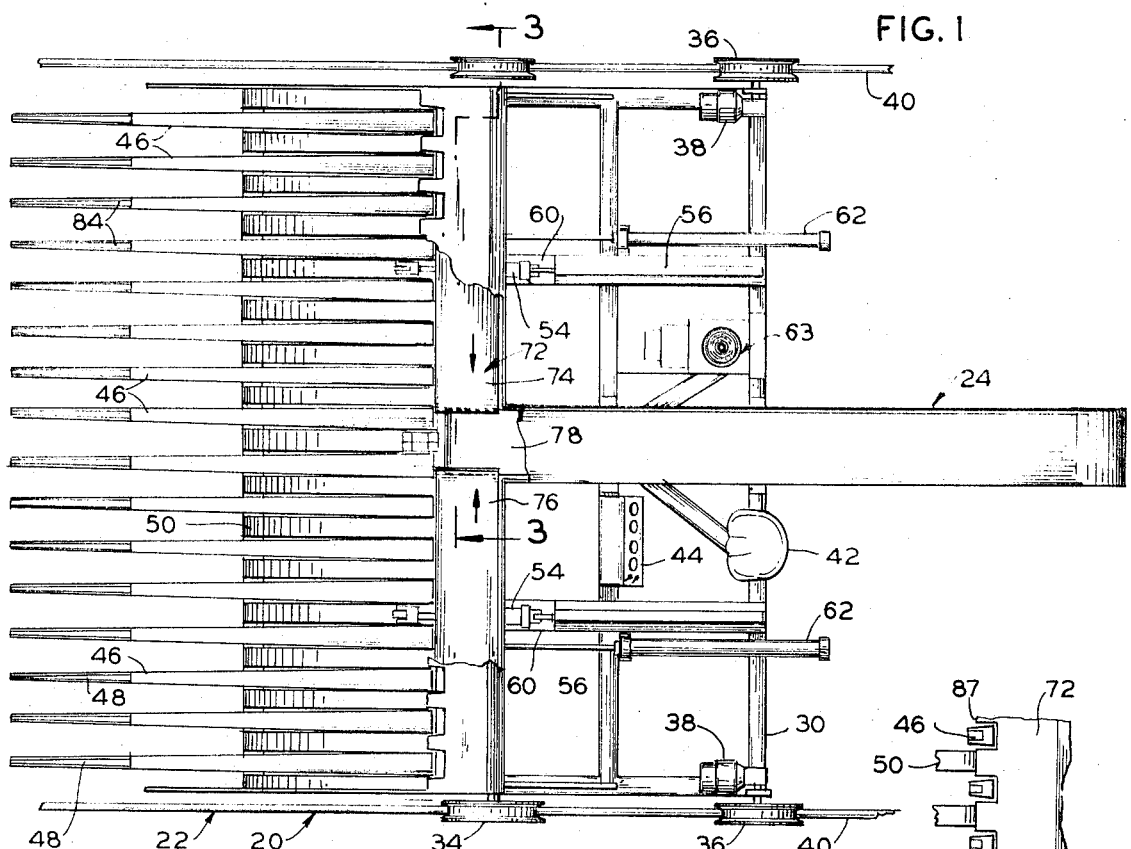
FIG. 1
FIG. 1A
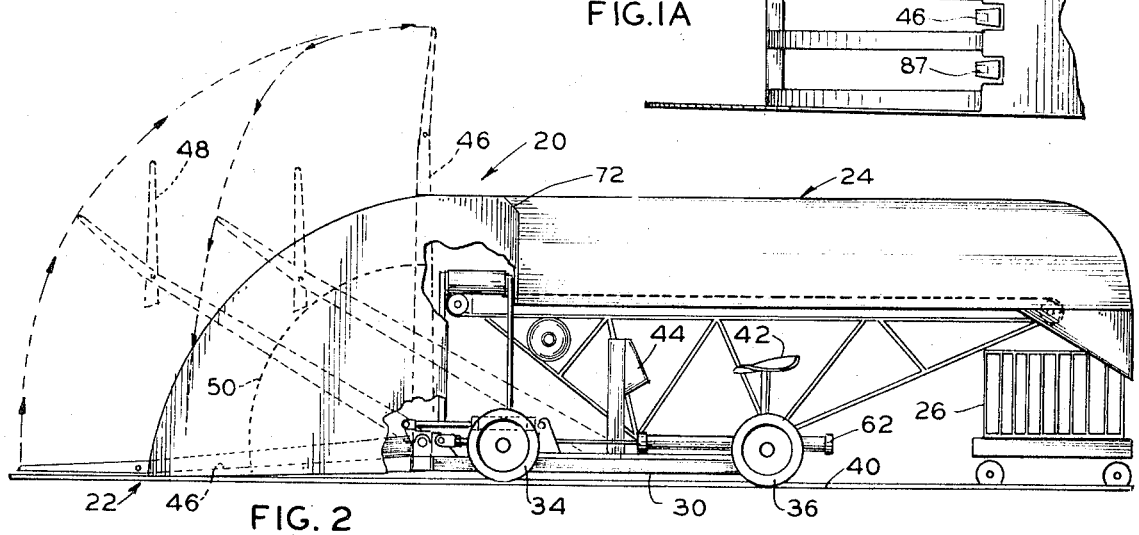
FIG. 2
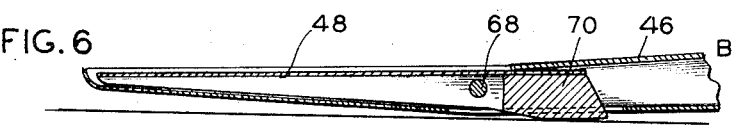
FIG. 6
INVENTOR
JAMES E. CHRISTOPHER
BY Kingsland, Rogers, Ezell, Eilers & Robbins
ATTORNEYS INVENTOR
JAMES E. CHRISTOPHER
BY Kingsland, Rogers, Ezell,
Eilers & Robbins
ATTORNEYS

PATENTED JAN 15 1974 3,785,349

INVENTOR
JAMES E. CHRISTOPHER

BY Kingsland, Rogers, Ezell,
Eilers & Robbins

ATTORNEYS 3,785,349

LIVE POULTRY CATCHER

This is a continuation of application Ser. Nos. 781,345 and 48,921, filed Dec. 5, 1968 and June 18, 1970, respectively, both now abandoned.

SUMMARY OF THE INVENTION

The poultry catcher of this invention is designed for use in large present day poultry houses. Modern poultry houses are quite large, extending up to 500 feet and sometimes more in length and 40 feet and more in width, containing 5,000 and upwards of poultry. The collection or catching of such poultry for delivery to the market is a time consuming operation. By means of the instant invention the live poultry catcher can be used with only one attendant compared to upwards of ten laborers previously required, depending on the size of the operation.

The live poultry catcher is designed to extend across or partly across the width of a poultry house or longitudinal sections and rides on rails or soft tires to drive forward to collect poultry in front and collect them. The apparatus uses collecting pickup bars, which are extensible from a retracted position to the front of the apparatus, to present the pickup bars in the manner of the teeth of a rake underneath the chickens. The chickens are then picked up by rotation of the pickup bars. The chickens, once placed on the pickup bars, tend to stay still and not move very much. Tip guards are provided at the front of the pickup bar. A protective shield or baffle is interposed between the pickup bars at their rear. The shield is slotted to pass the pickup bars, such that the chickens are delivered when they are elevated into a hood. The hood is provided with two horizontal and laterally directed conveyor belts which deposit the chickens into a central longitudinally running conveyor belt as a collection point. The darkened hood encloses and envelopes the chickens when they are deposited on the conveyor belts. The chickens are quieted and do not panic, since the darkness calms them.

After charging of the chickens onto the longitudinally running central conveyor belt, the chickens are delivered into an extensible tunnel conveyor. This extensible tunnel conveyor is comprised of several sections which are pivotally connected, such that the individual sections can be extended or compressed and folded together in the fashion of an accordion. After final delivery in the conveyor tunnel into a pickup crate, the chickens are ready for delivery as required.

The above features are objects of this invention and further objects will appear in the detailed description which follows and will be otherwise aparent to those skilled in the art.

For the purpose of illustration of this invention, there is shown in the accompanying drawings a preferred embodiment thereof. It is to be understood that these drawings are for the purpose of example only and that the invention is not limited thereto.

In the drawings:

FIG. 1 is a top plan view of the poultry catcher partly broken away;

FIG. 1A is an enlarged fragmentary top plan view showing the interfitting of the pickup bars with the top of the hood when the pickup bars are elevated;

FIG. 2 is a view in side elevation of the poultry catcher;

FIG. 6 is a fragmentary view in vertical section of the pickup bar and tip guard;

DESCRIPTION OF THE INVENTION

Figure 3:
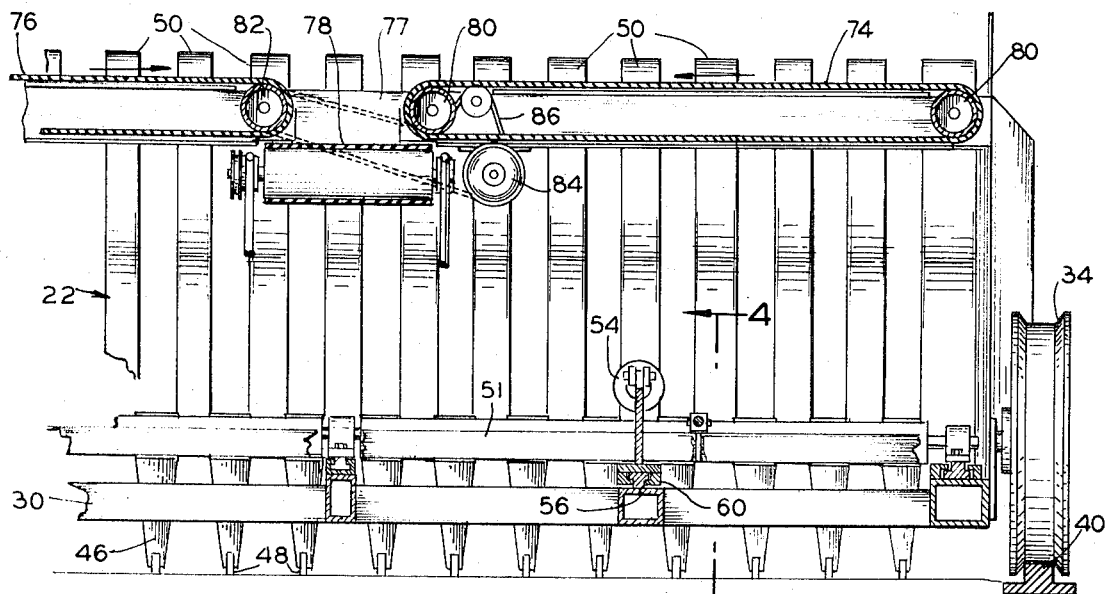
FIG. 3 is a vertical view in section taken on the line 3—3 of FIG. 1.

Referring now to the drawings, the poultry catcher of this invention is generally identified by the reference numeral 20 in FIGS. 1, 2 and 3. As there shown, it is comprised of a catcher section 22 and a conveyor section 24, which is shown delivering into a crate 26 carried at the rear end of the conveyor section. The poultry catcher 22, as shown in FIGS. 1, 2 and 3, is comprised of a frame 30, supporting a pair of front wheels 34 and rear wheels 36. The rear wheels are powered by a motor 38. A screw-type gear (not shown) to raise or lower the back wheels up or down with respect to the frame may be furnished in order to change the angle of the pickup bars. This is provided so the pickup bars can be adjusted to stay close to the ground level. The front wheels are flanged and are adapted to ride upon parallel tracks 40 extending adjacent the side walls along the length of the poultry house. Soft rubber tires may be used also. Soft rubber may be used to prevent the machine from settling in the soft litter in the house. An operator's seat 42 is mounted at the rear of the frame behind an operator's panel 44 on which the apparatus control may be mounted.

At the front of the poultry catcher are closely spaced pick-up bars 46 to which are pivotally connected tip guards 48 which rise to a vertical position when the pickup bars are elevated to keep the chickens or other poultry from riding off the front end of the bars. A protective shield or baffle 50 of fiber glass or other convenient material of construction extends between the pickup bars to prevent damage to the chickens and to insure that the ckickens ride on top of the bars without becoming entangled there-between. The leading edge of the baffle may have a soft material on it to prevent brusing or injuring the poultry. This soft material may be covered with a plastic tape so poultry will glide smoothly on to the conveyor. This is best understood by referring to FIGS. 1 and 4.

Figure 4:
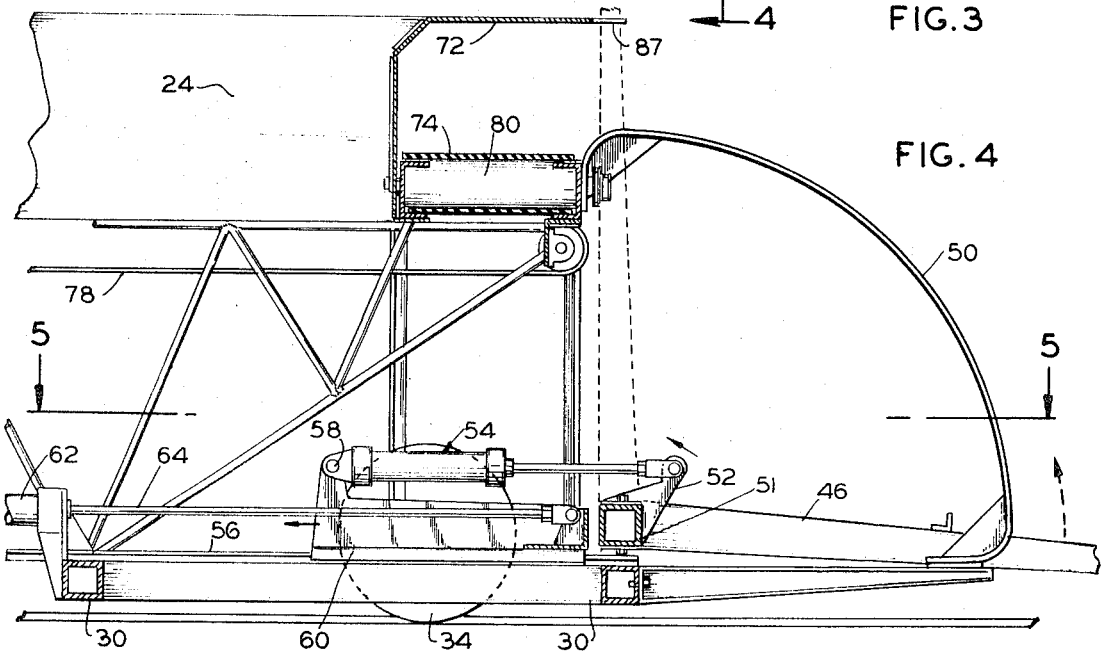
FIg. 4 is a vertical view in section taken on the line 4—4 of FIG. 3.
Figure 5:
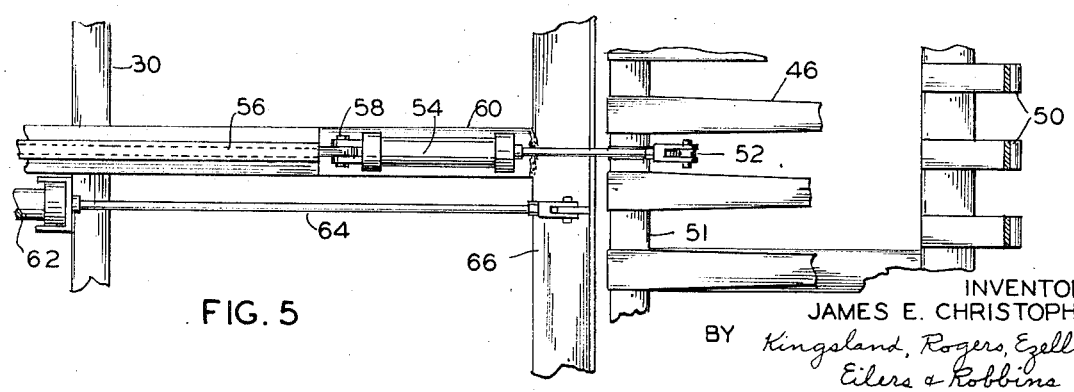
FIG. 5 is a horizontal view in section taken on the line 5—5 of FIG. 4.

The pickup bars are mounted at their rear end upon a transversely extending brace member 51 as shown in FIG. 5. The rear brace member in turn is connected by a pivot link 52 to a hydraulic lift cylinder 54, as shown in FIG. 4. The lift cylinder is mounted upon a guide track 56, as shown in FIG. 5, so that the entire lift cylinder can move to the front and to the rear along said guides. The lift cylinder 54 is pivotally mounted by a pivot 58 to a carriage 60, which moves within the guide track 56.

A second hydraulic cylinder 62 is mounted at the rear of the frame. The second hydraulic cylinder provides forward and rearward movement of a power shaft 64, which is connected at its front end to the transversely extending support member 66. The support member 66 is slidably connected to the guide 56 and the carriage 60 such that when the support member 66 is retracted or moved forwardly it moves the hydraulic cylinder 54 with it to cause the forward or retracted movement of the pickup bars. The operation of the hydraulic cylinder 54 in turn causes the pivotal movement of pickup bars as shown in FIG. 2. The hydraulic pump for the cylinders 54 and 62 is shown in FIG. 1 by a reference numeral 63 mounted at the rear of the frame.

The tip guards 48 are best shown in FIG. 6. The guards are pivotally connected by a pivot pin 68 to the forward end of the pickup bars 46. The rear of these pickup bars are provided with a counterweight 70 such that when the pickup bars are elevated the tip guards rotate to a vertical position as shown in FIG. 2. It will be understood that instead of weighting the rear ends they may also be spring loaded with a latch device or positive control means can be provided to the operator's panel so that the operator can cause the vertical movement by conventional control mechanism as will be well understood in the art.

The top of the poultry catching section 22 as shown in FIG. 4 is provided with a hood 72, which is open at the front. The hood encloses a pair of oppositely rotating conveyor belts as shown in FIG. 3. Conveyor belt 74 at the right hand portion of the machine and conveyor belt 76 at the left hand portion of the machine operate in the position of the arrows so that the chickens discharged thereupon are moved to a central collection zone 77. Underlying the central collection zone is a central longitudinally extending conveyor belt 78. The conveyor belt 78, as will be further described, moves the chickens to the rear of the apparatus to the tunnel conveyor section 24.

The conveyor belt 74 is mounted upon support rollers 80 connected to the frame and the conveyor belt 76 likewise is connected to a pair of rollers 62, also connected to the frame. A motor 84, as shown in FIG. 3 through a power belt 86, provides motive power to the rollers. The hood, as shown in FIG. 1A, is notched by notches 87 at the forward edge to receive the pickup bars to cage the chickens as they are loaded into the hood. The pickup bars are not lowered until the chickens are discharged by conveyor belts 74 and 76 to the central conveyor belt 78.

Figure 7:
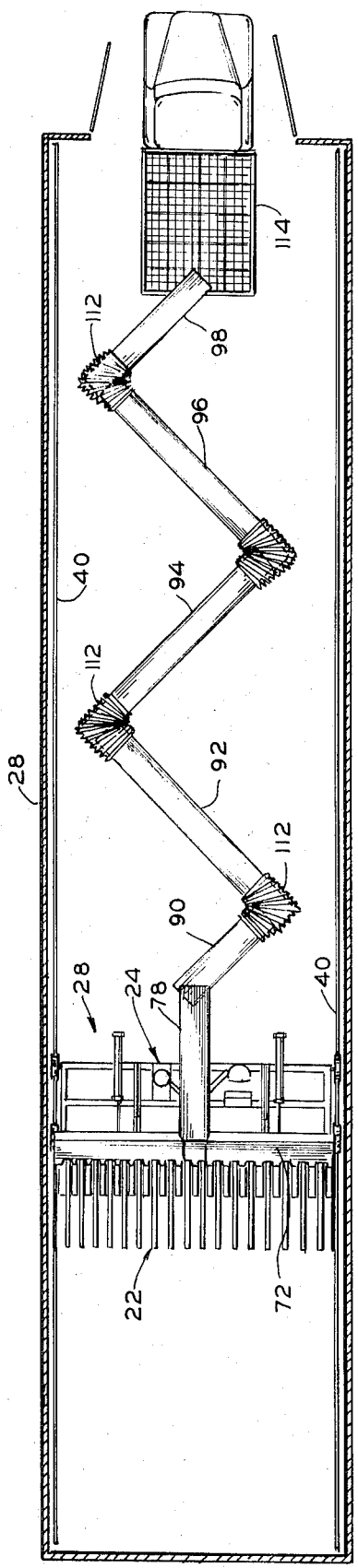
FIG. 7 is a plan view on reduced scale showing the modified form of the poultry catcher with an extensible discharge conveyor extended.
Figure 9:
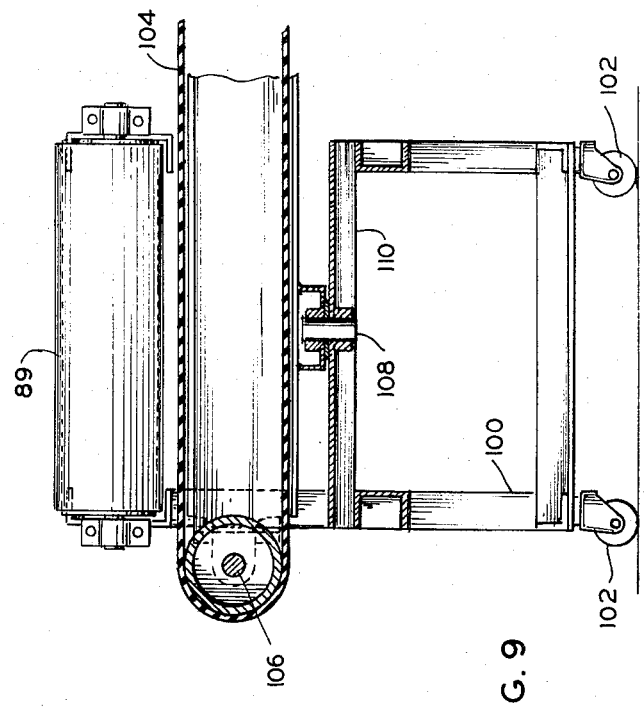
FIG. 9 is an enlarged fragmentary view partly in vertical section showing the connection of one accordion section to adjacent conveyor section.
Figure 8:
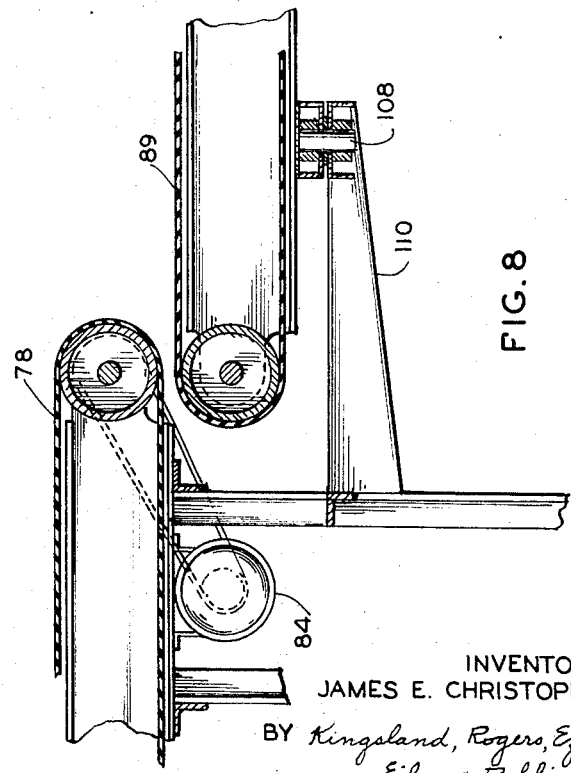
FIG. 8 is an enlarged view of the modification of FIG. 7 in vertical section without the tunnel hood, for the purpose of clarity, showing the discharge central belt from the poultry catcher feeding on to the conveyor belt in the conveyor hood.

FIGS. 7, 8 and 9 show a modified form of the apparatus using an extensible conveyor belt in the fashion of an accordion which can be extended through a considerable length of the poultry house to charge into a large collection receptacle, such as a truck or the like. As there shown, the central longitudinally extending conveyor 78 charges into the forward section 90 of the tunnel conveyor. As shown in FIG. 8, the conveyor 78 overlies conveyor 89 housed within the tunnel section 90. Additional tunnel sections 92, 94, 96 and 98 are mounted upon wheel bases 100 provided with swivel wheels 102. Thus, as shown in FIG. 9, each of the tunnel sections will be provided with a conveyor belt as shown in FIGS. 8 and 9. FIG. 9 shows a typical conveyor section in which a top conveyor belt 89 is positioned over underlying conveyor belt 104. Powering rollers 106 to move the conveyor belt are mounted upon the base 100. Swivel movement is effected by means of a journal 108 mounted on a transverse brace 110 on the base 100. A flexible sleeve 112 is provided between each of the sections to provide for the extension or collapsing of the conveyor sections in the fashion of an accordion.

The end section 98 of the conveyor is shown directed into a track 114 parked at one end of the poultry house. The section 98 may be connected at its rear end to the truck so that as the poultry catching apparatus advances in the house the conveyor section is extended with the rear end remaining connected to the truck to discharge the collected poultry.

OPERATION

In the operation of the poultry catcher, the apparatus is first placed at one end of the building with the tunnel conveyor section collapsed where the modified form of FIGS. 7-10 is employed The rear conveyor section 98 may be charged into a pickup truck where the chickens are ultimately to be delivered. The apparatus extends from one side of the house to the other so that all the chickens are to the front of the machine. It will be understood that where the apparatus is not as wide as the building fences may be erected to channel the poultry in front of the apparatus.

In operation the apparatus is moved forwardly with the pickup bars extended horizontally and to the front of the machine. It will be understood that these pickup bars may be retracted until the apparatus is near the chickens, at which point the pickup bars can be extended horizontally so that the horizontally extending pickup bars and tip guards extend underneath the chickens. When the chickens are on top of the pickup bars, the operator will operate the hydraulic cylinder 54, which causes the counterclockwise rotation of the pickup bars as viewed in FIG. 4. As viewed in FIG. 2, the pickup bars will move in clockwise in an arc-like direction in the path of the full bodied arrow. As the pickup bars are elevated, the tip guards will move the vertical position due to the weights 70, thus confining the chickens on the pickup bars and the protective shield. The chickens will then ride upon the pickup bars and upon the top of the protective shield 50 to the top where they are deposited upon the transversely running conveyor belts 74 and 76 which run together to the central collection zone 77. The chickens are caged within the darkened hood 72, and due to the darkened condition, to not panic and simply ride upon the conveyor belts to the central longitudinally running conveyor belt 78.

In the modification shown in FIGS. 1-6, the central conveyor belt 78 enclosed in a hood or tunnel 79 charges directly into the collection crate 26.

In the embodiment employing the expandable tunnel section of FIGS. 7-10, the chickens ride upon each of the conveyors in the individual sections 90, 92, 94, 96 and 98 to be ultimately deposited for collection into the pickup truck 114 or other collection container.

After the pickup of one load of chickens, the hydraulic cylinder 54 is extended to cause the downward movement of the pickup bars. The second hydraulic cylinder 62 is also operated to cause the retraction of the pickup bars into the protective shield to prevent the pickup bars falling on chickens in front of the apparatus. The downward and retracted movement of the pickup bars is shown in the dotted line in FIG. 2. The apparatus is then ready for another operation and pickup of an additional load of chickens in the same manner as previously described.

Various changes and modifications may be made within this invention as will be readily apparent to those skilled in the art. Such changes and modifications are within the scope and teaching of this invention as defined by the claims appended hereto.

What is claimed is:

1. A live poultry catching and loading device comprising a frame, means for propelling said frame along the ground, poultry support means extensible under the poultry for elevating said poultry and depositing them upon a conveyor means.

2. The device of claim 1 in which said extensible means comprises a plurality of longitudinally extending pick up bars, said bars being closely spaced to support the poultry thereon.

3. The device of claim 2 in which protective shield means are provided between said bars, said shield means extending to adjacent said conveyor means.

4. The device of claim 1 in which tip guards are mounted at the end portions of said bars, said guards extending horizontally when the pick up bars are extended and means for moving said guards to a vertical position when said pick up bars are elevated to provide a guard for the chickens and prevent their falling off said bars.

5. The device of claim 2 in which said pick up bars are rotatably mounted on said frame, means for rotating the pick up to elevate the poultry thereon and deposit the poultry onto said conveyor means.

6. The device of claim 5 in which said protective shield means is generally concentric with the rotational path of the pick up bars for guiding the poultry onto said conveyor means.

7. The device of claim 5 in which the pick up bars are rotatable to a limiting upward position in registry with a front opening of a collection hood, said conveyor means extending into said hoods to cage the poultry in said hood and upon the conveyor means.

8. The device of claim 5 in which said pick up bars are provided with means for longitudinal retraction and advancement.

9. The device of claim 3 in which said pick up bars are provided with means for longitudinal retraction and advancement from a position behind and in front of said protective shield.

10. The device of claim 1 in which a pair of transverse belt conveyors are provided at opposite sides of said frame to direct poultry charged thereon to a central longitudinally running conveyor belt means.

11. The device of Claim 10 in which said longitudinally running conveyor belt means is enclosed by a protective light blocking tunnel.

12. The device of claim 11 in which the longitudinally running conveyor belt means are comprised of a plurality of pivotally connected sections, whereby an end section may be stationed adjacent a collection means and the intermediate sections may be expanded as the poultry loading device advances.

13. A live poultry catching and loading device comprising a frame, means for propelling said frame along the ground, poultry support means extensible under the poultry and a collection hood, said poultry support means being movable from a poultry catching position to a loading position to load the poultry into said collection hood.

14. The loading device of claim 13 in which a transport means extends into said hood for transporting the poultry away from the hood.

15. A live poultry catching and loading device comprising a frame, means for propelling said frame along the ground, poultry support means extensible under the poultry for elevating said poultry and depositing them under a collection hood upon conveyor means extending into said hood.

16. The device of claim 4 in which said tip guards are pivotally mounted on said bars and in which a rear portion of said guard has a greater weight than a forward portion of said guards to cause said forward portion to rise from a horizontal guard engaging position to a vertical guard position when said bars are elevated.

17. The device of claim 4 in which said tip guards are spring biased to cause a forward portion of said guards to rise from a horizontal guard engaging position to a vertical guard position when said bars are elevated.

* * * * *